UNITED STATES PATENT OFFICE.

HENRY C. HUMPHREY, OF NEW YORK, ASSIGNOR TO FRANZ O. MATTHIESSEN, OF IRVINGTON, N. Y., AND WILLIAM A. WIECHERS, OF NEW YORK CITY.

PROCESS OF ECONOMICALLY OBTAINING STARCH AND GLUCOSE FROM CORN.

SPECIFICATION forming part of Letters Patent No. 231,804, dated August 31, 1880.

Application filed February 19, 1880.

*To all whom it may concern:*

Be it known that I, HENRY C. HUMPHREY, of the city and State of New York, have invented a certain Process of Economically Obtaining Starch and Glucose from Corn, of which the following is a specification.

It is the twofold object of my improvement to lessen the cost of obtaining from corn its commercially valuable constituents, and to avoid the waste of a certain percentage of starch which has heretofore been left in the residuum resulting from the ordinary processes of treating corn for the manufacture of starch, and which has been too small in quantity to be capable of economical separation. This residuum has been usually disposed of as fodder for cattle, and has been, comparatively speaking, a waste product.

The economy of my mode of treatment is the result, first, of the fact that I separate from the corn that proportion of starch which is most easily and readily obtainable, and, secondly, that I treat my residuum, which may be unusually rich in starchy matter, for the manufacture from it of glucose or grape-sugar.

I have found that the ordinary residuum of starch-manufacture contains, for every bushel of corn treated, an amount of starch capable of conversion into from four to six pounds of glucose, of the average value of, say, fourteen cents. It will therefore be seen that while I obtain from the corn under treatment that proportion of its starch which can be most economically separated, I also avoid the usual waste of starchy matter in the residuum by converting such starchy matter into glucose or grape-sugar, which are commercially valuable products.

The various steps of my method of treatment are as follows: Having soaked and pressed the corn, I wash the resultant mass with water, and then strain it, and thus separate a portion of the starchy matter of the corn, which I manufacture into starch by the usual methods. I now have a residuum consisting of the husks of the kernels and the remainder of the starchy matter of the corn, which I mix with water acidulated with oxalic or some other strong acid. I boil the mixture two hours, more or less, until conversion into glucose is indicated by the usual iodine test, or, if desired, until conversion into sugar is indicated by the usual alcohol test. This boiling may be done either in an open or closed vessel, and with the usual appliances for heating with steam.

The proportion of the mixture may be, say, one hundred pounds (more or less) of the residuum to fifty pounds of water, with two pounds of oxalic or other acid.

After conversion the liquid portion of the mixture is separated by filtration through bags or by pressure, and in the usual manner is then neutralized, defecated, and filtered through bone-black, and then evaporated to the density of, say, 42° Baumé.

If the converted product be sugar, the liquid, after evaporation, is allowed to harden and concrete into proper packages.

I claim as my invention—

The herein-described process of obtaining starch and glucose consecutively from the same lot of corn, which consists in separating a portion only of the starch and then treating the remainder of the corn by the ordinary methods for the manufacture of glucose, whereby a greater or less quantity of starch, as economy demands, is left in the corn, to be subsequently devoted to the production of glucose, as set forth.

HENRY C. HUMPHREY.

Witnesses:
M. L. ADAMS,
EDWD. PAYSON.